United States Patent
Liu et al.

(10) Patent No.: US 9,567,835 B2
(45) Date of Patent: Feb. 14, 2017

(54) SYSTEM AND METHOD FOR MANAGING BATTERIES FOR USE IN A DOWNHOLE DRILLING APPLICATION

(71) Applicant: EVOLUTION ENGINEERING INC., Calgary (CA)

(72) Inventors: Jili Liu, Calgary (CA); Xia Pan, Calgary (CA); David A. Switzer, Calgary (CA); Aaron W. Logan, Calgary (CA)

(73) Assignee: EVOLUTION ENGINEERING INC. (CA)

( * ) Notice: Subject to any disclaimer, the term of this patent is extended or adjusted under 35 U.S.C. 154(b) by 22 days.

(21) Appl. No.: 14/770,348

(22) PCT Filed: Feb. 27, 2014

(86) PCT No.: PCT/CA2014/050143
§ 371 (c)(1),
(2) Date: Aug. 25, 2015

(87) PCT Pub. No.: WO2014/131126
PCT Pub. Date: Sep. 4, 2014

(65) Prior Publication Data
US 2016/0003007 A1    Jan. 7, 2016

Related U.S. Application Data

(60) Provisional application No. 61/770,278, filed on Feb. 27, 2013.

(51) Int. Cl.
*H02J 7/00* (2006.01)
*E21B 41/00* (2006.01)
(Continued)

(52) U.S. Cl.
CPC .......... *E21B 41/00* (2013.01); *E21B 41/0085* (2013.01); *E21B 47/12* (2013.01); *E21B 47/122* (2013.01);
(Continued)

(58) Field of Classification Search
CPC ...................................................... H02J 7/0063
(Continued)

(56) References Cited

U.S. PATENT DOCUMENTS

| 5,467,083 A | 11/1995 | McDonald et al. |
| 7,074,064 B2 * | 7/2006 | Wallace ............... E21B 17/028 166/65.1 |

(Continued)

FOREIGN PATENT DOCUMENTS

| EP | 1546765 A2 | 6/2005 |
| WO | 2011133909 A1 | 10/2011 |
| WO | 2012078726 A2 | 6/2012 |

OTHER PUBLICATIONS

International Search Report for PCT/CA2014/050143, mailed on May 13, 2014.

*Primary Examiner* — Yalkew Fantu
(74) *Attorney, Agent, or Firm* — George C. Rondeau, Jr.; Davis Wright Tremaine LLP (57) ABSTRACT

The present disclosure is directed at methods, systems, and techniques for managing batteries for use in a downhole drilling application. The system includes a power bus, pairs of battery terminals for connecting to batteries, switching circuitry that connects and disconnects the batteries to the power bus, data collection circuitry that obtains battery parameters obtained during system operation, and a controller that controls the switching circuitry and receives the battery parameters. A control line connects the controller to the switching circuitry and a data line connects the controller (Continued)

to the data collection circuitry, with the control and data lines being distinct such that control and data signals are not multiplexed with each other.

33 Claims, 8 Drawing Sheets

(51) Int. Cl.
 *H02J 13/00* (2006.01)
 *E21B 47/12* (2012.01)
(52) U.S. Cl.
 CPC ........... *H02J 7/00* (2013.01); *H02J 7/0063* (2013.01); *H02J 13/00* (2013.01); *H02J 13/0003* (2013.01); *H02J 2007/0067* (2013.01)
(58) Field of Classification Search
 USPC .......................................................... 320/116
 See application file for complete search history.

(56) References Cited

U.S. PATENT DOCUMENTS

| 7,605,591 | B2 | 10/2009 | Tsenter et al. |
| 7,667,942 | B2* | 2/2010 | Boling ............... H02J 7/0031 361/103 |
| 7,717,167 | B2 | 5/2010 | Storm et al. |
| 8,220,545 | B2 | 7/2012 | Storm, Jr. et al. |
| 2007/0194947 | A1* | 8/2007 | Huang .................. E21B 47/14 340/854.3 |
| 2007/0194948 | A1* | 8/2007 | Hall .................... E21B 17/003 340/854.8 |
| 2010/0039116 | A1 | 2/2010 | Tsenter et al. |
| 2013/0207613 | A1* | 8/2013 | Loncarevic ........... H02J 7/0016 320/134 |
| 2014/0111030 | A1* | 4/2014 | Chou .................... G05F 1/10 307/130 |

* cited by examiner

PRIOR ART

FIG. 1(a)

PRIOR ART

SYSTEM AND METHOD FOR MANAGING BATTERIES FOR USE IN A DOWNHOLE DRILLING APPLICATION

TECHNICAL FIELD

The present disclosure is directed at systems, methods, and techniques for managing batteries for use in a downhole drilling application.

BACKGROUND

The recovery of hydrocarbons from subterranean zones relies on the process of drilling wellbores. The process includes using drilling equipment situated at surface and a drill string extending from equipment on the surface to a subterranean zone of interest such as a formation. The drill string can extend thousands of meters below the surface. The downhole terminal end of the drill string includes a drill bit for drilling the wellbore. Drilling wellbores also typically involves using some sort of drilling fluid system to pump a drilling fluid ("mud") through the inside of the drill string, which cools and lubricates the drill bit and then exits out of the drill bit and carries rock cuttings back to the surface. The mud also helps control bottom hole pressure and prevents hydrocarbon influx from the formation into the wellbore and potential blow out at the surface.

Directional drilling is the process of steering a well from vertical to intersect a target endpoint or to follow a prescribed path. At the downhole terminal end of the drill string is a bottom-hole-assembly ("BHA") that includes 1) the drill bit; 2) a steerable downhole mud motor; 3) sensors including survey equipment (e.g. one or both of logging-while-drilling ("LWD") and measurement-while-drilling ("MWD") tools (both "LWD" and "MWD" are hereinafter collectively referred to as "MWD" for simplicity)) to evaluate downhole conditions as drilling progresses; 4) telemetry equipment to transmit data to surface; and 5) other control equipment such as stabilizers or heavy weight drill collars. The BHA is conveyed into the wellbore by a string of metallic tubulars known as drill pipe. The MWD equipment is used to provide in a near real-time mode downhole sensor and status information to the surface while drilling. This information is used by the rig operator to make decisions about controlling and steering the drill string to optimize the drilling speed and trajectory based on numerous factors, including lease boundaries, existing wells, formation properties, hydrocarbon size and location, etc. This can include making intentional deviations from the planned wellbore path as necessary based on the information gathered from the downhole sensors during the drilling process. The ability to obtain real-time data allows for a relatively more economical and more efficient drilling operation.

MWD is performed using MWD tools, each of which contains a sensor package to survey the wellbore and to send data back to the surface by various telemetry methods. Such telemetry methods include, but are not limited to telemetry via a hardwired drill pipe, acoustic telemetry, telemetry via a fiber optic cable, mud pulse ("MP") telemetry and electromagnetic ("EM") telemetry.

MP telemetry involves using a fluid pressure pulse generator to create pressure waves in the circulating mud in the drill string. Mud is circulated between the surface and downhole using positive displacement pumps. The resulting flow rate of mud is typically constant. The pulse generator creates pressure pulses by changing one or both of the flow area and path of the mud as it passes through the MWD tool in a timed, coded sequence, thereby creating pressure differentials in the drilling fluid. The pressure differentials or pulses may either be negative pulse or positive pulses in nature. Valves that use a controlled restriction within the circulating mud stream create a positive pressure pulse. Some valves are hydraulically powered to reduce the required actuation power typically by using a main valve controlled by a pilot valve. The pilot valve closes a flow restriction, which actuates the main valve and creates a change in pressure.

The pressure pulses generated by the pulse generator are used to transmit information acquired by the downhole sensors. Signals from the sensors are received and processed in a data encoder in the BHA where the data is digitally encoded. A controller then actuates the pulse generator to generate the mud pulses, which are modulated to represent the data. For example, the directional or inclination data is conveyed or modulated using the physical mud pulse by generating the mud pulse at a particular amplitude and frequency. Typically a high-frequency sinusoid waveform is used as a carrier signal, but a square wave pulse train may also be used.

A typical arrangement for EM telemetry uses parts of the drill string as an antenna. The drill string is divided into two conductive sections by including an electrically insulating joint or connector (a "gap sub") in the drill string. The gap sub is typically placed within the BHA such that metallic drill pipe in the drill string above the gap sub serves as one antenna element and metallic sections below the gap sub serve as another antenna element. EM telemetry signals can then be transmitted by applying electrical signals across the two antenna elements. The signals typically include very low frequency AC signals applied in a manner that codes information for transmission to the surface. The electromagnetic signals may be detected at the surface, for example by measuring electrical potential differences between the drill string and one or more grounding rods spaced from the drill string.

Both EM and MP telemetry systems use a downhole source of power. One common power source is downhole batteries.

MWD systems contain power systems that are generally of two types. The first type uses a turbine or other generator to produce power downhole, and the second type uses specialized batteries developed for downhole applications. Turbines are powered via circulation of drilling fluid, whereas batteries operate independently of drilling fluid flow. In some cases, both types of power systems are used to help ensure adequate power is delivered to service all downhole load requirements. The batteries are typically lithium-thionyl chloride batteries, which provide high energy density and can withstand temperatures of up to approximately 180-200° C. Many downhole batteries are rated to be able to store approximately 26-28 A·h @ 3.6 V per cell. The load is generally determined by electrical components within the BHA, drill collar geometry, gap sub or mud pulser specifications, and the properties of the surrounding formation. As an example, the current drawdown on the gap sub will vary depending on signal attenuation to the surface; or in a mud pulser, the current drawdown will vary with the torque required to actuate the valve that generates mud pulses. An example of a typical industry battery is Exium™ Technologies Inc. MWD 3.6 DD size Li-SOCL$_2$.

Figure 1A:
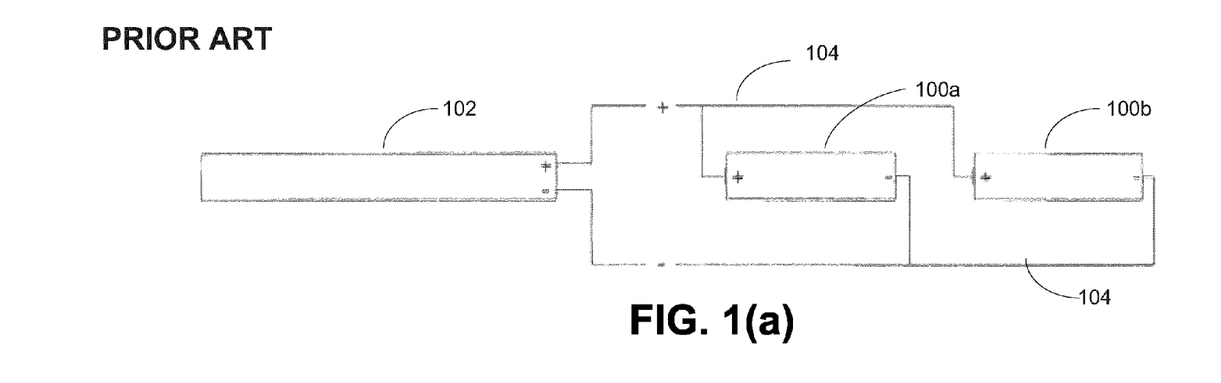
FIGS. 1(a) and (b) (PRIOR ART) show exemplary prior art battery assemblies for use in a downhole MWD application.
Figure 1B:
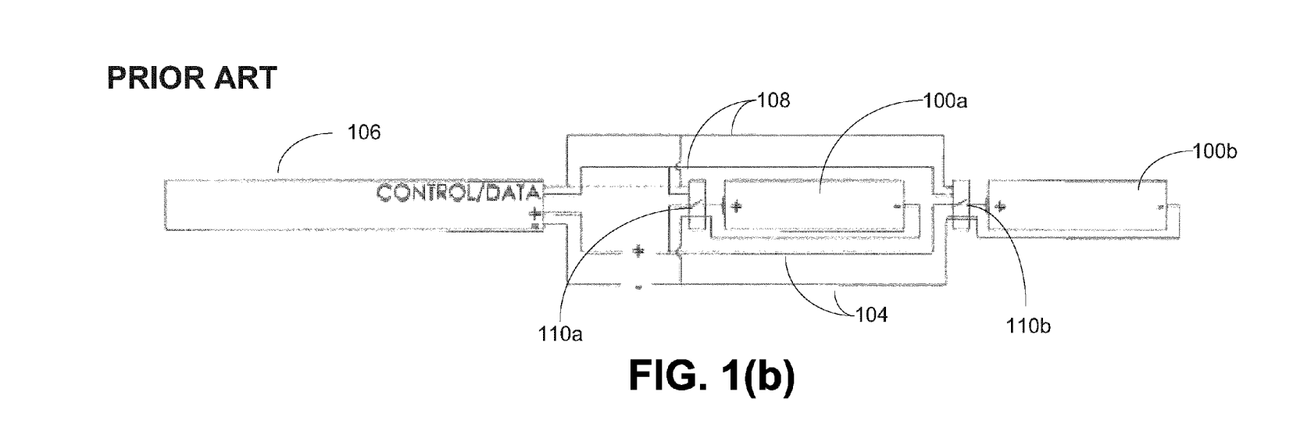

Referring now to FIGS. 1(a) and (b), there are shown prior art battery management systems for use in downhole applications. FIG. 1(a) shows a first battery 100a and a second battery 100b (collectively, the first and second batteries 100a,b are the "batteries 100") electrically connected in parallel via power lines 104. The power lines 104 terminate at a power bus 102 to which an electrical load, such as a motor when MP telemetry is used or the gap sub when EM telemetry is used, is connected. The system of FIG. 1(a) includes no switching circuitry and no data collection circuitry; that is, both of the batteries 100 are connected constantly to the power bus 102, and neither the voltages of the batteries nor the currents output by the batteries are readily determinable.

FIG. 1(b) shows another exemplary prior art battery management system. In FIG. 1(b), the first and second batteries 100a,b are electrically connected in parallel as they are in FIG. 1(a), and the batteries 100 are also electrically connected to a combined power and data bus 106 via the power lines 104. A first circuit board 110a is placed adjacent the first battery 100a and a second circuit board 110b is placed adjacent the second battery 100b (collectively, the circuit boards 110a,b are the "circuit boards 100"), and on each of the circuit boards 110 is switch and measurement circuitry that measure voltage and current and calculate the power used by the system. The circuit boards 110 are communicative with the power and data bus 106 via control and data lines 108, over which control signals sent to the circuit boards 110 and data signals received from the circuit boards 110 are multiplexed.

Notwithstanding these existing battery management systems, there exists a continued need for methods, systems, and techniques to manage batteries used in downhole MWD applications.

SUMMARY

According to a first aspect, there is provided a battery management system for use in a downhole drilling application. The battery management system comprises: a power bus; pairs of battery terminals wherein each of the battery terminals is for connecting to a battery; switching circuitry operable to electrically connect the power bus to and to disconnect the power bus from any one or more of the pairs of battery terminals that are connected in parallel; data collection circuitry operable to obtain battery parameters of batteries connected to the pairs of battery terminals; a controller operable to control the switching circuitry and to receive the battery parameters from the data collection circuitry; a control line which communicatively connects the controller to the switching circuitry; and a data line, which is distinct from the control line, and which communicatively connects the controller to the data collection circuitry.

There may be multiple control lines, in which case the controller may be configured to use each of the control lines to control each of the pairs of battery terminals. There may also be multiple data lines, in which case the controller may be configured to use each of the data lines to receive the battery parameters from only one of the batteries.

A capacitor bank may be electrically connected in parallel to the power bus.

The data collection circuitry may comprise current samplers electrically connected to the pairs of battery terminals such that current flowing through each of the pairs of battery terminals is measurable. The data collection circuitry may also comprise A·h meters electrically connected to the pairs of battery terminals to record usage of each of the batteries. The data collection circuitry may also comprise voltmeters electrically connected to the pairs of battery terminals to record voltage of each of the batteries.

The control circuitry may be configured to disconnect the any one or more of the battery terminals from the power bus when current flowing out of the any one or more of the battery terminals exceeds a current shutdown threshold or when instructed by the controller.

The controller, switching circuitry, and control line may be on a common printed circuit board. The system may further comprise usage tracking boards connected to the pairs of battery terminals, each of which has mounted thereon one of the A·h meters. Each of the usage tracking boards comprises a printed circuit board distinct from the printed circuit board on which the controller, switching circuitry, and control line are located.

The drilling application may be downhole telemetry, in which case the controller may be further configured to send a signal to surface indicating when the usage level of none of the batteries meets the active usage threshold.

The controller may be configured to use time division multiplexing to receive the battery parameters from any one of the batteries at any given time. The controller may also be configured to, for at least one of the batteries: (i) determine a usage level of the battery; (ii) compare the usage level to an active usage threshold, and (iii) when the usage level of at least one of the batteries meets the active usage threshold, use at least one of these batteries as a constant power source for the drilling application. The controller may be configured to use only one of the batteries as the constant power source. Alternatively, the controller may be further configured to use some or all of the batteries together as the constant power source when the usage level of none of the batteries individually meets the active usage threshold. Or, the controller may be configured to use as the constant power source the battery having the usage level that is highest of all the usage levels that have been determined. For at least one of the batteries, the controller may be further configured to determine a voltage level of the battery; compare the voltage level to a safe voltage threshold; and only use the battery as the constant power source if the voltage level of the battery exceeds the safe voltage threshold.

The controller may be further configured to determine when the charge level of the battery that is used as the constant power source ("initial primary battery") ceases to meet the active usage threshold. When the charge level of the initial primary battery ceases to meet the active usage threshold, the controller determines whether the usage level of any of the other batteries meets the active usage threshold. When the usage level of any of the other batteries meets the active usage threshold, the controller: (1) ceases to use the initial primary battery as the constant power source; and (2) of the batteries whose usage level meets the active usage threshold, uses the battery having the highest usage level as the constant power source.

The controller may be further configured to use at least one of the batteries not used as the constant power source ("backup battery") to supplement energy provided by the at least one of the batteries that is used as the constant power source ("primary battery"). At least one of the batteries may have an unknown usage level, and the controller may be configured to use as the backup battery at least one of the batteries that has an unknown usage level. The controller may be configured to use the backup battery to supplement energy when current drawn from the primary battery exceeds a current assist threshold, or when voltage of the primary battery falls below a voltage assist threshold. The controller may also be configured to use the backup battery to supplement energy in response to an impending telemetry event.

According to another aspect, there is provided a method for managing batteries used in a downhole drilling application. The method comprises for at least one of the batteries: (i) determining a usage level of the battery; (ii) comparing the usage level to an active usage threshold; and (iii) when the usage level of at least one of the batteries meets the active usage threshold, using as a constant power source for the drilling application at least one of the batteries whose usage level meets the active usage threshold.

According to another aspect, there is provided a system for use in a downhole drilling application to adjust signal-to-noise ratio ("SNR") of a signal sent from downhole to surface, wherein the SNR and a minimum SNR required to accurately decode the telemetry signal are measured at the surface, and wherein a downlink signal indicating that the SNR is to be reduced is sent downhole when the SNR exceeds the minimum SNR by a sufficiently large margin. The system comprises: a signal transmitter located downhole for transmitting the telemetry signal; a signal receiver located downhole for receiving the downlink signal; and a processor communicative with the signal transmitter and signal receiver, wherein upon receipt of the downlink signal by the signal receiver, the processor is configured to decrease the SNR by reducing signal strength while maintaining the SNR above the minimum SNR.

According to another aspect, there is provided a method for adjusting the SNR of a telemetry signal sent from downhole to surface, which comprises at the surface, determining the SNR of the telemetry signal; comparing the SNR of the telemetry signal to a minimum SNR required to accurately decode the telemetry signal; when the SNR exceeds the minimum SNR by a sufficiently large margin, sending a downlink signal from the surface instructing that the power of the telemetry signal be reduced; and decreasing the SNR by reducing signal strength while maintaining the SNR above the minimum SNR, wherein the SNR and the minimum SNR are as measured at the surface. The telemetry signal may be an electromagnetic signal. When the SNR is below the minimum SNR, the method may further comprise sending a downlink signal from the surface instructing that the power of the telemetry signal be increased above the minimum SNR; and increasing the SNR above the minimum SNR by increasing signal strength.

According to another aspect, there is provided a non-transitory computer readable medium having encoded thereon statements and instructions to cause a controller to perform any of the foregoing methods or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Figure 2:
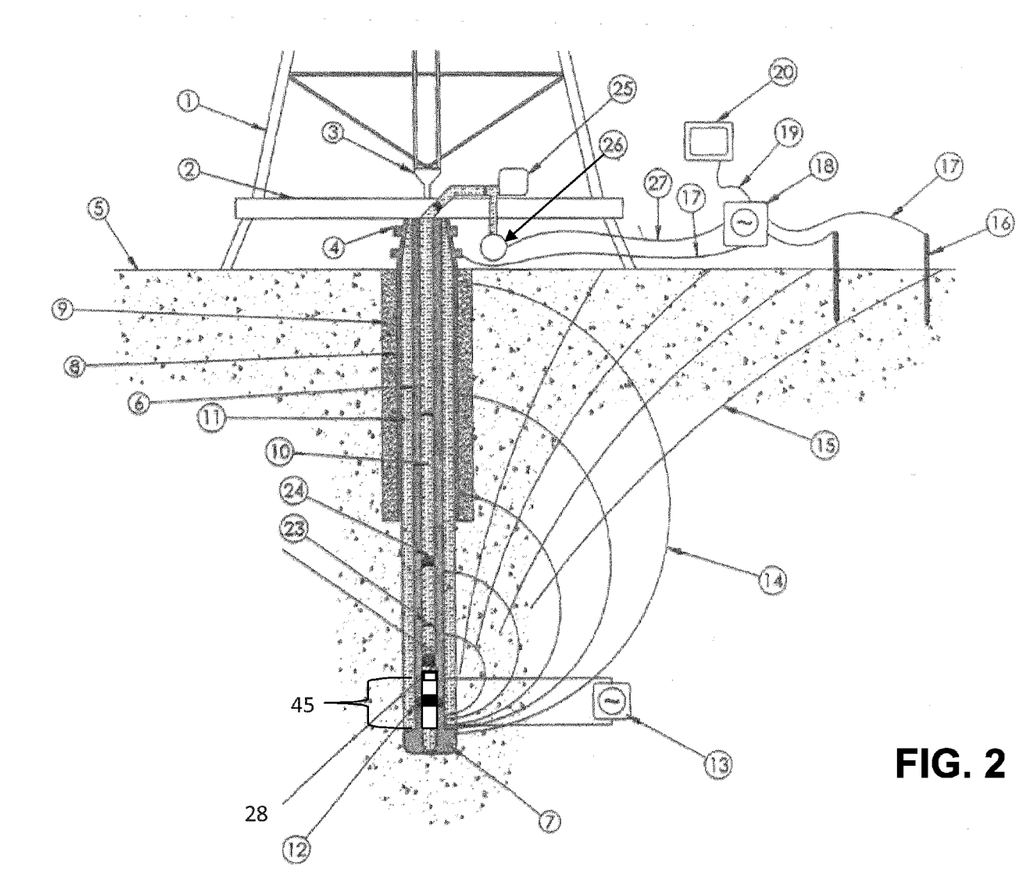
FIG. 2 shows a telemetry system that is capable of both electromagnetic and mud pulse telemetry, according to one embodiment.

Referring to FIG. 2, there is shown a schematic representation of a combined EM and MP telemetry system in which various embodiments of a battery management system can be employed. It is to be noted that while FIG. 2 depicts a combined EM and MP telemetry systems, embodiments of the battery management system can also be used in EM-only and MP-only telemetry systems (not shown). Downhole drilling equipment including a derrick 1 with a rig floor 2 and draw works 3 facilitate rotation of drill pipe 6 into the ground 5. The drill pipe 6 is enclosed in casing 8 which is fixed in position by casing cement 9. Bore drilling fluid 10 is pumped down the drill pipe 6 and through an electrically isolating gap sub assembly 12 by a mud pump 25 to a drill bit 7. Annular drilling fluid 11 is then pumped back to the surface and passes through a blowout preventer ("BOP") 4 positioned above the ground surface. The gap sub assembly 12 is electrically isolated (nonconductive) at its center joint effectively creating an electrically insulating break, known as a gap between the top and bottom parts of the gap sub assembly 12. The gap sub assembly 12 may form part of the BHA and be positioned at the top part of the BHA, with the rest of the BHA below the gap sub assembly 12 and the drill pipe 6 above the gap sub assembly 12 each forming an antennae for a dipole antennae.

The combined EM and MP telemetry system comprises a downhole MWD telemetry tool 45 and surface receiving and processing equipment. The telemetry tool 45 comprises an EM telemetry unit having an EM signal generator 13 which generates an alternating electrical current 14 that is driven across the gap sub assembly 12 to generate carrier waves or pulses which carry encoded telemetry data ("EM telemetry transmission"). The low frequency AC voltage and magnetic reception is controlled in a timed/coded sequence by the telemetry tool 45 to energize the earth and create an electrical field 15, which propagates to the surface and is detectable by the surface receiving and processing equipment 18 of the MWD telemetry system. The telemetry tool 45 also includes a MP telemetry unit having a fluid pressure pulse generator 28 for generating pressure pulses in the drilling fluid 10 which carry encoded telemetry data ("MP telemetry transmission"). At surface, the surface receiving and processing equipment includes a receiver box 18, computer 20 and other equipment to detect and process both EM and MP telemetry transmissions. To detect EM telemetry transmissions, communication cables 17 transmit the measurable voltage differential from the top of the drill string and various surface grounding rods 16 located about the drill site to EM signal processing equipment, which receives and processes the EM telemetry transmission. The grounding rods 16 are generally randomly located on site with some attention to site operations and safety. The EM telemetry signals are received by the receiver box 18 and then transmitted to the computer 20 for decoding and display, thereby providing EM measurement-while-drilling information to the rig operator. To detect MP telemetry transmissions, a pressure transducer 26 that is fluidly coupled with the mud pump 25 senses the pressure pulses 23,24 and transmits an electrical signal, via a pressure transducer communication cable 27, to MP signal processing equipment for processing. The MP telemetry transmission is decoded and decoded data is sent to the computer display 20 via the communication cable 19, thereby providing MP measurement-while-drilling information to the rig operator.

Figure 3:
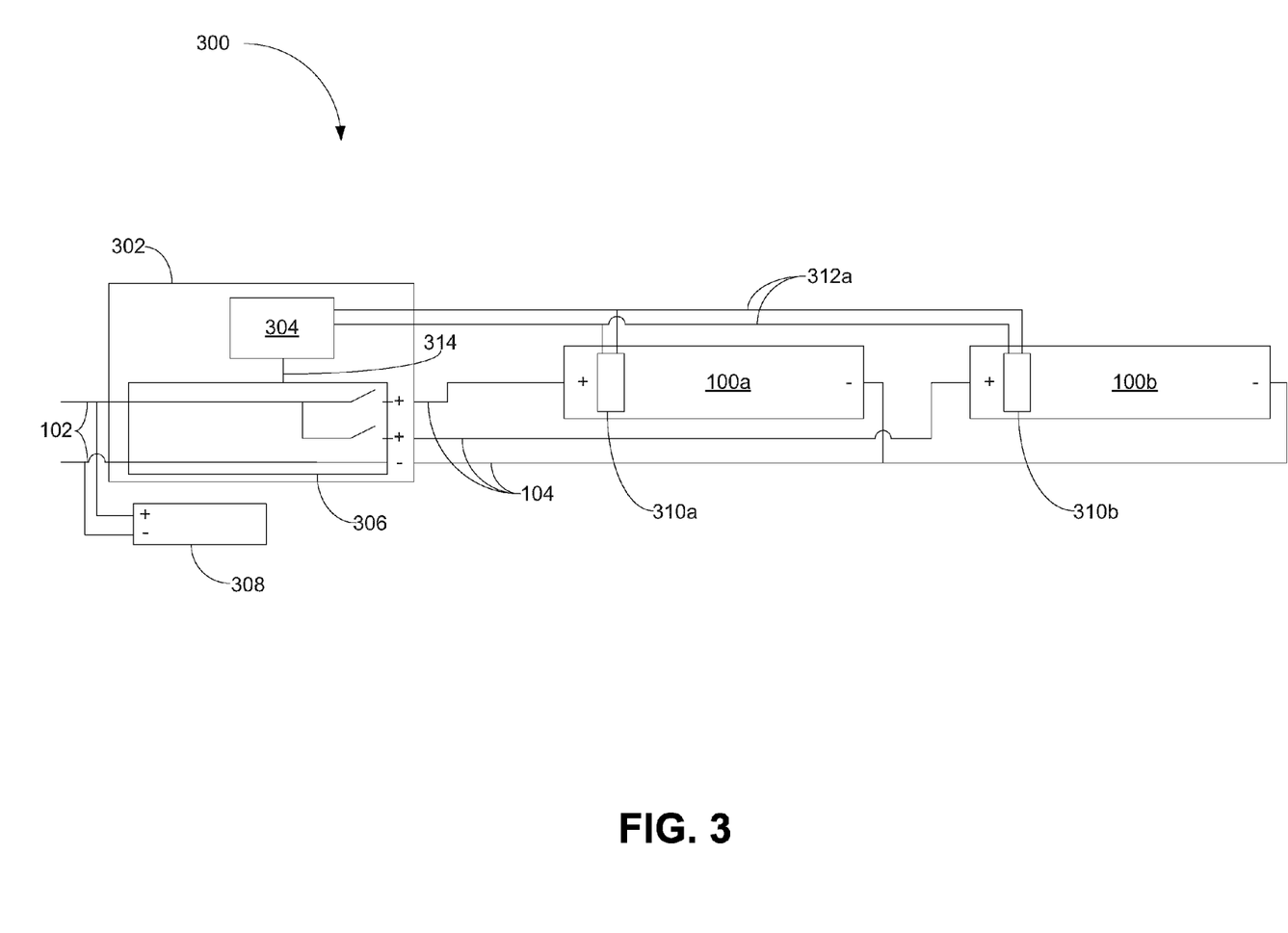
FIG. 3 shows a block diagram of a battery management system for use in a downhole MWD application, according to another embodiment.

Within the telemetry tool 45 is a power source for telemetry equipment in the form of batteries. The batteries are managed by a battery management system 300, an exemplary embodiment of which is shown in FIG. 3. The system 300 includes a printed circuit board, hereinafter referred to as a battery management control board ("BMCB") 302, which is electrically connected to the batteries 100 via the power lines 104, which link the BMCB 302 to pairs of battery terminals that are in physical contact with the batteries' 100 positive and negative terminals. The battery terminals, and hence the batteries 100, are electrically connected in parallel. The BMCB 302 includes the power bus 102 and switching circuitry 306 that is operable to electrically connect the power bus 102 to and to disconnect the power bus 102 from any one or more of the pairs of battery terminals. A controller 304, which also forms part of the BMCB 302, is communicative with and operable to control the switching circuitry 306 via a control line 314. In the system 300 shown in FIG. 3, the single control line 314 is used to switch between two batteries 100; however, in alternative embodiments, such as the embodiment shown in FIG. 4, each of the batteries 100 may have its own dedicated control line 314. A capacitor bank 308 is electrically connected in parallel to the power bus 102 and helps to reduce current draw on the batteries 100 during times of high electrical load. In the depicted embodiment the batteries 100 are each J size batteries having ten cells, with each cell rated at 3.6 V and 40 A·h. Each of the batteries 100 is consequently rated at 36 V and 40 A·h.

Adjacent to the first battery 100a is a first usage tracking board ("UTB") 310a and adjacent to the second battery 100b is a second UTB 310b (collectively, the first and second UTBs 310a,b are hereinafter referred to as the "UTBs 310"). The UTBs 310 are distinct from the BMCB 302. Each of the UTBs has mounted on it measurement devices that are connected to one of the pairs of battery terminals and that are operable to obtain battery parameters such as current being discharged by each of the batteries 100, battery voltage, and total A·h output by each of the batteries 100. The UTBs 310 and the measurement devices mounted on them collectively comprise data collection circuitry that is connected to the controller 304 via data lines 312. In the system 300 of FIG. 3, battery parameters for both of the batteries 100 are transmitted on each of the data lines 312; however, in alternative embodiments such as that shown in FIG. 4, each of the data lines 312 may be dedicated to transmitting battery parameters for only one of the batteries 100. The data lines 312 and the control line 314 are distinct from each other in that control signals and data signals are not multiplexed on common lines.

Figure 4:
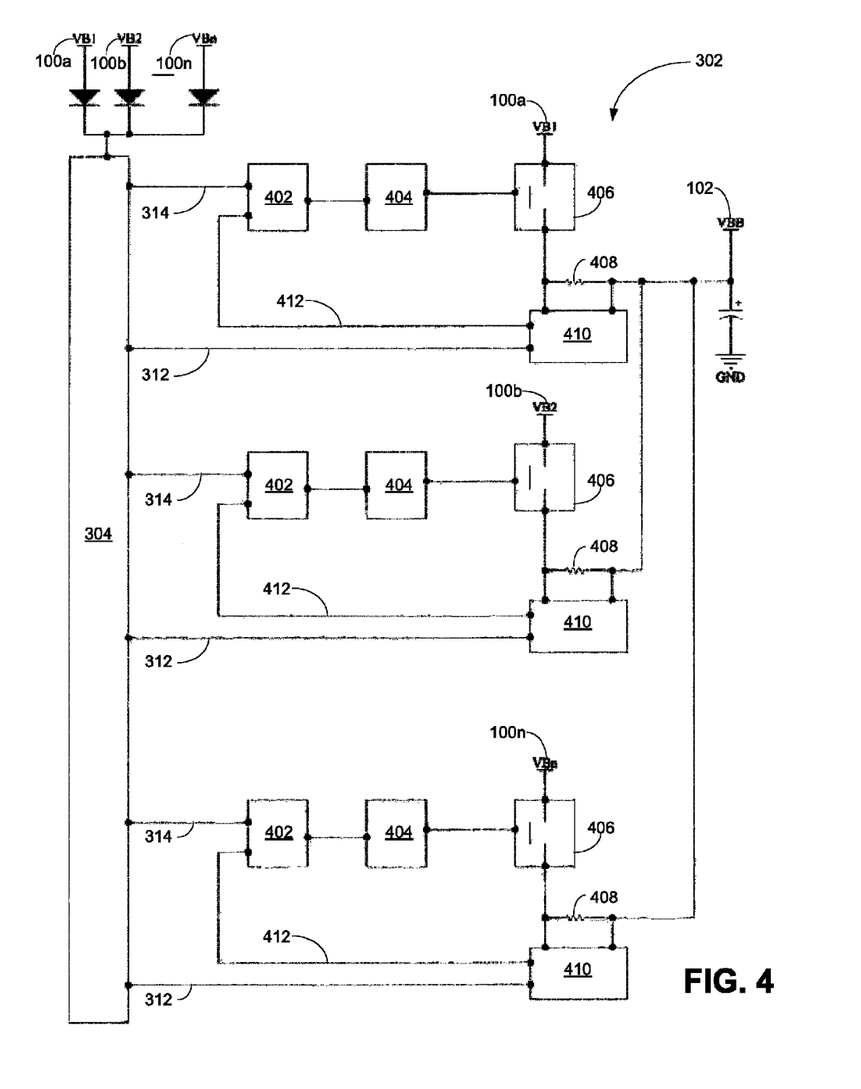
FIG. 4 shows a block diagram of a battery management control board for use in the battery management system, according to another embodiment.

FIG. 4 shows an exemplary embodiment of the BMCB 302. The BMCB 302 is connected to n batteries 100, of which the first battery 100a, the second battery 100b, and an nth battery 100n are shown in FIG. 4. The first battery 100a is electrically connected to the power bus 102 via a battery switch 406, which connects the positive terminal to which the battery 100a is connected to the power bus 102. Electrically connected in series between the battery switch 406 and the power bus 102 is a current sampling resistor 408, across which is electrically connected a current sampler 410. All of the current that the battery 100a discharges to the power bus 102 passes through the current sampling resistor 408. The battery switch 406 has a control terminal operable to open and close the switch 406, thereby connecting the battery 100a to and disconnecting the battery 100a from the power bus 102. The current sampler 410 is configured with the resistance of the current sampling resistor 408, and is consequently able to determine the current that the battery 100a is discharging by measuring the voltage drop across the resistor 408. The current sampler 410 determines the current that the battery 100a is discharging using Ohm's law, the resistance of the resistor 408, and the measured voltage drop across the resistor 408, and transmits the magnitude of this current to the controller 304 via the data line 312. The current sampler 410 also compares the magnitude of the current that the battery 100a is discharging to a current shutdown threshold, which represents the largest current that the battery 100a can safely discharge. When the battery 100a is discharging a current that exceeds the current shutdown threshold, the current sampler 410 outputs an active low safety shutdown signal along a shutdown line 412. Current draw is typically between 0.5 A to 5 A, with anywhere between 2 A and 7 A considered a safe operating zone. An exemplary current shutdown threshold is accordingly 7 A.

The control terminal of the battery switch 406 is communicative with the output of a switch controller 404, which in turn is controlled by the output of an AND gate 402. One input of the AND gate 402 is connected to the control line 314, which conveys signals from the controller 304 to the AND gate 402. When the controller 304 wishes to disconnect the battery 100a from the power bus 102, the controller 304 drives the control line 314 low; similarly, the controller 304 drives the control line 314 high when it wishes to connect the battery 100a to the power bus 102. The other input of the AND gate 402 is connected to the shutdown line 412. Consequently, the switch controller 404 will cause the switch 406 to disconnect the battery 100a from the power bus 102 when current flowing out of the battery 100a exceeds the current shutdown threshold or when instructed by the controller 304.

The other batteries 100b . . . n are electrically connected to the controller 304 and to the power bus 102 in the same manner as the first battery 100a.

In the BMCB 302 of FIG. 4, each of the pairs of battery terminals is connected to or disconnected from the power bus using a dedicated one of the control lines 314. Similarly, battery parameters for each of the batteries 100, such as current being output by the batteries 100, are communicated using a dedicated one of the data lines 312. Because the control and data signals for any one of the batteries 100 are communicated using a dedicated line 312,314, the controller 304 can rapidly obtain data for, and connect to and disconnect from the power bus 102, any one of the batteries 100 without having to experience the latency that would be present if the control and data signals were multiplexed on the same line. While in FIG. 4 each of the pairs of a single one of the control lines 314 and of the data lines 312 sends control signals to and receives data from each of the pairs of terminals, in alternative embodiments different setups are possible. For example, while the data and control lines 312,314 of the BMCB 302 of FIG. 3 remain distinct, control signals for the batteries 100 are multiplexed over the same control line 314 and data signals for the batteries 100 are multiplexed over the same data lines 312.

The BMCB 302 is communicative with processors elsewhere in the MWD equipment. For example, the BMCB 302 may be communicative with processors that control MP or EM telemetry ("MP processor" and "EM processor", respectively, neither of which are shown) and can inform these processors of the current state of the batteries 100. For example, the BMCB 302 may be communicative with one or both of the MP and EM processors via the data lines 312, with signals exchanged between the BMCB 302 and any one or more of the MP processor, EM processor, and data collection circuitry being multiplexed over the data lines 312. In one embodiment, these signals are time division multiplexed. In an alternative embodiment (not shown), separate data lines may be used to communicatively couple the BMCB 302 to any one or more of the MP processor, EM processor, and data collection circuitry.

Figure 5:
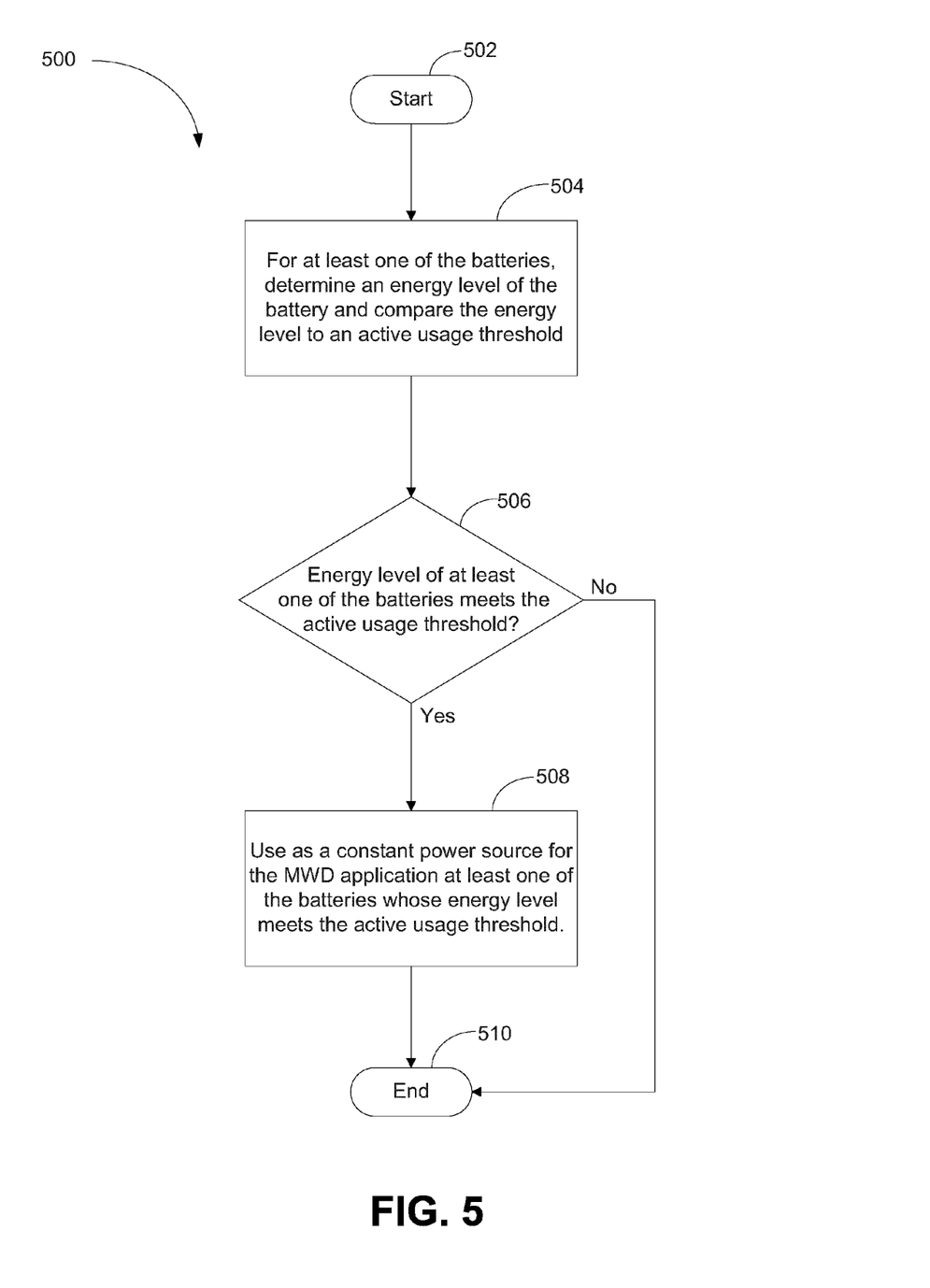
FIGS. 5 and 6 show a method for managing batteries for use in a downhole MWD application, according to additional embodiments.
Figure 6:
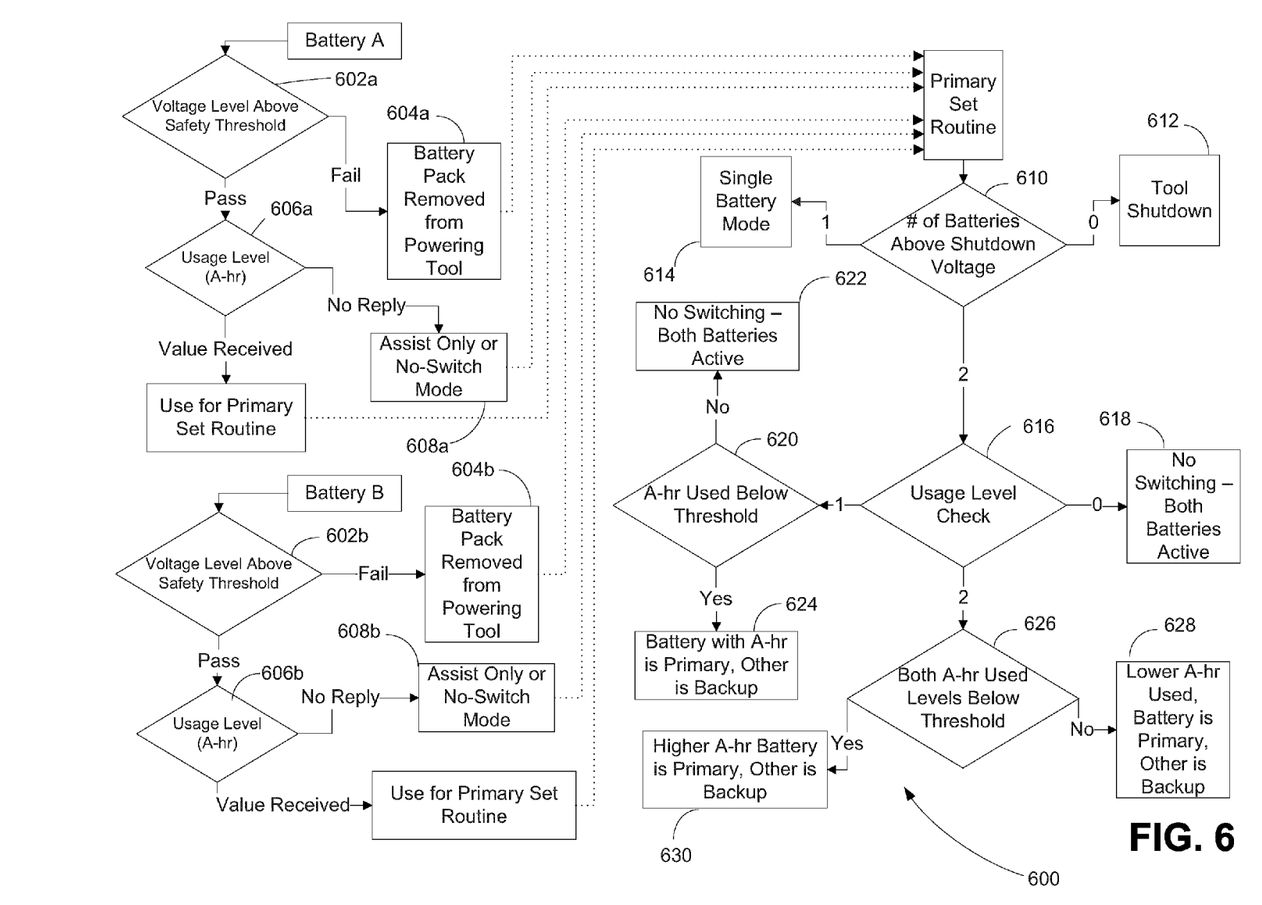

Referring now to FIGS. 5 and 6, there are shown embodiments of methods 500, 600 for managing batteries for use in a downhole MWD application. The methods 500, 600 may be encoded as statements and instructions on a non-transitory computer readable medium that is communicative with the controller 304 to enable the controller 304 to perform the methods 500, 600 using the battery management system 300. When the controller 304 is able to analyze each of the batteries 100 in accordance with the methods 500, 600, the controller 304 categorizes each of the batteries 100 to be a primary battery, a backup battery, or a dead battery. As discussed in further detail below, the controller 304 may periodically re-evaluate the batteries 100 and re-categorize them depending on the battery parameters at any given time.

A primary battery is a battery that is constantly electrically connected to the power bus 102, and consequently acts as a constant power source subject to certain fault conditions, such as when the current being discharged by the primary battery exceeds the current shutdown threshold. A backup battery is a battery that is periodically connected to the power bus 102 to supplement the primary battery; the factors that determine whether to supplement the primary battery are discussed in more detail with respect to FIG. 7, below. A dead battery is a battery that is not used to provide power, and consequently the controller 304 leaves it constantly disconnected from the power bus 102.

When performing the method 500, the controller 304 begins at step 502 and proceeds to step 504. At step 504, the controller 304 determines, for at least one of the batteries 100, a usage level of the battery 100 and compares the usage level for that battery 100 to an active usage threshold. The usage level of the battery 100 is monitored using the UTB 310 to monitor the total A·h output by the battery 100 since the system 300 has been downhole. The UTB 310 transmits this A·h total to the controller 304, which compares it to the charge level of the battery 100 immediately prior to being inserted downhole ("initial charge level"). The controller 304 can accordingly determine the current charge level of the battery 100 by subtracting the number of A·h reported by the UTB 310 from the initial charge level, and can determine the current usage level by dividing the current charge level of the battery to the total energy capacity of the battery 100. The active usage threshold represents a preferred maximum usage level of primary batteries. In the depicted embodiment, the active usage threshold is 80%; that is, a primary battery preferentially has used 80% or less of its total energy. A battery that has at least 20% energy remaining is said to "meet" the active usage threshold.

If the controller 304 determines that at least one of the batteries 100 meets the active usage threshold, it uses at least one of those batteries 100 that meets the active usage threshold as the primary battery (step 508). The controller 304 may use several of the batteries 100 that meet the active usage threshold, electrically connected in parallel, as the primary battery. In the method 500 of FIG. 5, if the controller 304 does not determine that at least one of the batteries 100 meets the active usage threshold, the method 500 ends (step 510) and the primary battery may be determined in an alternative manner, as is done in some circumstances in FIG. 6.

The method 600 of FIG. 6 manages batteries for use in a downhole MWD application in an embodiment in which the first and second batteries 100a,b are used as power sources. When performing the method 600 of FIG. 6, the battery management system 300 operates in one of three modes at any given time:

(a) a "normal mode", in which at any given time one of the batteries 100 is used as the primary battery and the other of the batteries 100 is used as the backup battery;
(b) a "single battery mode" in which one of the batteries 100 is used as the primary battery and the other battery 100 is treated as a dead battery and disconnected from the power bus 102; and
(c) a "no switching mode", in which both of the batteries are used as the primary batteries.

At step 602a,b, the voltage level of each of the batteries 100 is determined; the controller 304 may determine the batteries' 100 voltages, or alternatively the voltages may be determined manually. If either of the batteries' 100 voltages are below a safe voltage threshold, which is a voltage below which the batteries 100 could suffer irreparable damage if operated, that battery 100 is removed from the BHA (steps 604a,b) and replaced with another battery. An exemplary safe voltage threshold for the depicted embodiment is approximately 2 V per cell, or 22 V per battery. Consequently, only batteries whose voltages meet the safe voltage threshold may act as the primary battery. If the voltage levels for both of the batteries 100 meet the safe voltage threshold, then the controller 304 attempts to determine the usage level of the batteries 100 (steps 606a,b). If the controller 304 is unable to determine the usage level, for example if the UTBs 310 have failed, then the batteries 100 whose usage levels are unknown will be used only as backup batteries when the system 300 is operating in single battery mode or as a primary battery when the system 300 is operating in no switch mode (steps 608a,b). Steps 602 to 608 collectively describe an "initialization routine" performed prior to placing the MWD equipment downhole. Following the initialization routine, the controller 304 performs a "primary set routine", which is described using steps 610 to 630.

At step 610, the controller 304 determines the number of batteries 100 whose voltage meets the safe voltage threshold. If both of the batteries 100 have voltages that meet the safe voltage threshold, the controller 304 proceeds to step 616 where it considers the batteries' 100 usage levels. If none of the batteries 100 meet the safe voltage threshold, then the controller 304 shuts down the MWD equipment to protect the batteries 100 (step 612). If only one of the batteries 100 meets the safe voltage threshold, the controller 304 causes the system 300 to operate in single battery mode (step 614) during which the battery 100 that meets the safe voltage threshold is the primary battery and the only battery 100 that provides power to the power bus 102. The controller 304 may perform the primary set routine periodically after performing the initialization routine; consequently, even if both of the batteries 100 satisfy the safe voltage threshold the first time, the controller 304 performs the primary set routine after performing the initialization routine, one or both of the batteries 100 may subsequently fail to meet the safe voltage threshold upon subsequent iterations of the primary set routine.

As noted above, if both of the batteries 100 meet the safe voltage threshold the controller 304 proceeds to step 616. At step 616 the controller 304 determines for how many of the batteries 100 the controller 304 is able to obtain a usage level. If the controller 304 cannot obtain usage levels for either of the batteries 100, it proceeds to step 618 and operates in no switching mode in which both the batteries 100 are used as the primary battery. If the controller 304 is able to obtain the usage level of only one of the two batteries 100, then the controller 304 proceeds to step 620. At step 620 the controller 304 determines whether the usage level of the one battery 100 is below the active usage threshold. If no, then the controller 304 operates the system 300 in no switching mode (step 622). If yes, then the controller 304 operates the system 300 in normal mode with the battery 100 for which the usage level is known as the primary battery and the other battery 100 as the backup battery (step 624). If the controller 304 is able to obtain the usage levels of both of the batteries 100, then the controller 304 proceeds to step 626 and determines whether the usage levels of both of the batteries 100 is below the active usage threshold. If no, then the controller operates in normal mode and uses the battery 100 that has a lower usage rating (i.e. the battery 100 that has more energy remaining) as the primary battery, with the other battery used as the backup battery (step 628). If both of the batteries 100 meet the active usage threshold, then the controller 304 operates the system 300 in normal mode with the battery 100 having the higher usage be the primary battery and the other battery 100 being the backup battery (step 630).

When the controller 304 operates the system 300 in normal mode (steps 624, 628, or 630), it monitors the usage level of the battery 100 that is initially assigned as the primary battery ("initial primary battery"). When the controller 304 determines that the usage level of the initial primary battery ceases to meet the active usage threshold, the controller 304 determines whether the usage level of the battery initially assigned as the backup battery ("initial backup battery") meets the active usage threshold. If so, the controller 304 ceases to use the initial primary battery as the primary battery, and assigns the initial backup battery to be the new primary battery and the initial primary battery to be the new backup battery.

Three examples are now described to illustrate how the controller 300 applies the primary set routine shown in FIG. 6.

Example 1

In this example, the usage level of the first battery 100a is 10% and the usage level of the second battery 100b is 25%. The active usage threshold is 80%. During operation of the system 300 the voltage levels of the batteries 100 remain above the safe voltage threshold. When performing the primary set routine, the controller 304 proceeds to step 630 since both batteries' usage levels are less than the usage threshold. The controller 304 assigns the second battery 100b to be the primary battery as its usage level is higher than that of the first battery 100a.

Example 2

In this example, the usage level of the first battery 100a is 69% and the usage level of the second battery 100b is 82%. The active usage threshold is 80%. During operation of the system 300 the voltage levels of the batteries 100 remain above the safe voltage threshold. When performing the primary set routine, the controller 304 proceeds to step 628 since one of the batteries 100's usage levels is above the active usage threshold while the other's is below the active usage threshold. The controller 304 accordingly assigns the first battery 100a to be the primary battery and the second battery 100b to be the backup battery.

Example 3

In this example, the usage level of the first battery 100a is 69% and the usage level of the second battery 100b is 82%. The active usage threshold is 80%. During operation of the system 300 the voltage of the first battery 100a falls below the safe voltage threshold while the voltage of the other battery 100b remains above the safe voltage threshold. When performing the primary set routine, the controller 304 proceeds to step 614 since one of the batteries 100's voltages is below the safe voltage threshold, and the controller 304 accordingly categorizes the second battery 100b as the primary battery and the first battery 100a as being dead.

Although FIG. 6 and Examples 1 through 3 depict exemplary embodiments in which only two batteries are used, in alternative embodiments one or more than two batteries may be managed by the system 300. For example, multiple batteries may be simultaneously used as the primary battery or as the backup battery.

Figure 7:
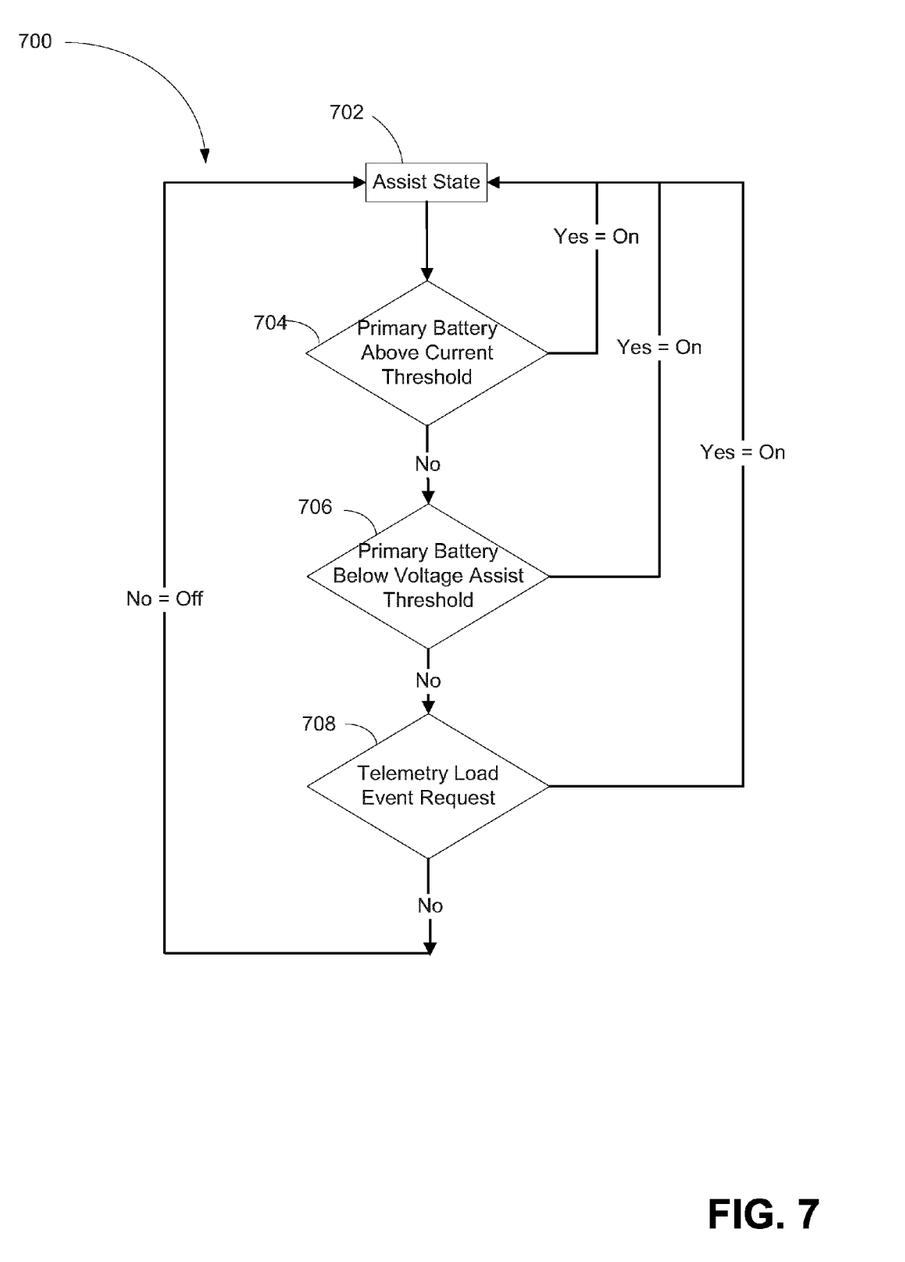
FIG. 7 shows a method for determining when a backup battery is to assist a primary battery, according to another embodiment.

Referring now to FIG. 7, there is shown a method 700 for determining when a backup battery is to assist a primary battery, according to another embodiment. The controller 304 performs the method 700 of FIG. 7 when operating the system 300 in normal mode. In FIG. 7, any of the three events in steps 704 to 708 triggers an interrupt that causes the controller 304 to electrically connect the backup battery to the power bus 102, thereby supplementing the energy that the primary battery is delivering: current drawn from the primary battery may exceed a current assist threshold (step 704), which is a threshold below the current shutdown threshold yet which is sufficiently high to indicate to the controller 306 that the primary battery is nearing its safe operating limits; the voltage of the primary battery falls below a voltage assist threshold (step 706); and a telemetry event is impending (step 708). Where the current shutdown threshold is 7 A, the current assist threshold may be between approximately 3 A and 6 A, for example. An exemplary voltage assist threshold for one of the batteries 100 is ⅔ of the battery's 100 voltage; in an exemplary embodiment in which each of the batteries 100 comprises ten 3.6 V cells, an exemplary voltage assist threshold is accordingly 24 V. If any of the events depicted in FIG. 7 occur, the controller 304 proceeds to step 702 and enters an "assist state" in which the backup battery is connected to the power bus 102 in response to relatively high power demands.

Figure 8:
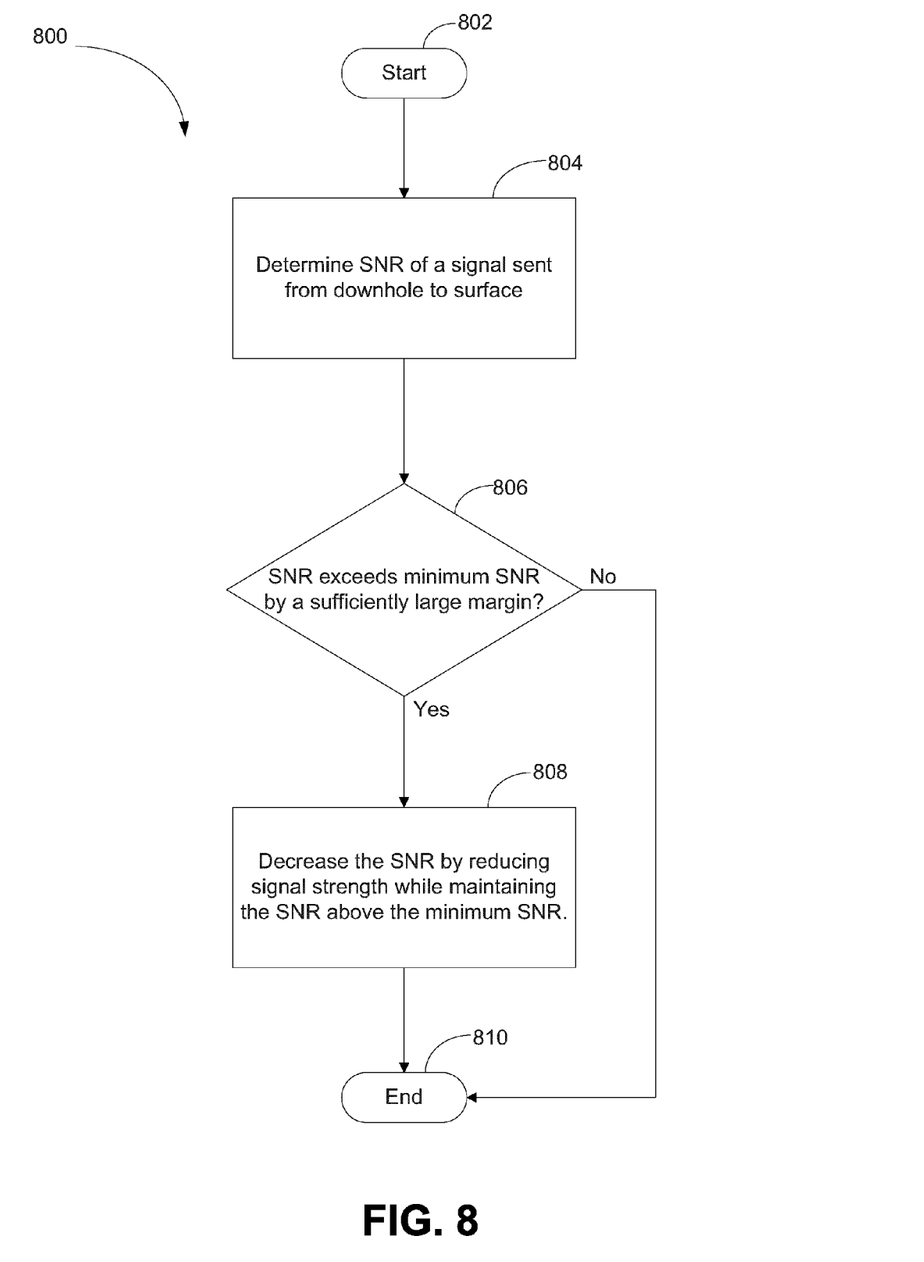
FIG. 8 shows a method for adjusting signal-to-noise ratio, according to another embodiment.

Referring now to FIG. 8, there is shown a method 800 for adjusting signal-to-noise ratio ("SNR") of a telemetry signal sent from downhole to surface, according to another embodiment. The method 800 begins at step 802 and proceeds to step 804 where the SNR of a telemetry signal sent from downhole to surface is determined. The SNR is determined using signal values for signal and noise measured at the surface. The SNR may be determined at surface by a MWD operator via surface receiver software, for example. The method proceeds to step 806 where the SNR is compared to a minimum SNR, also determined using signal and noise values measured at the surface, that is required to accurately decode the telemetry signal. If the SNR exceeds the minimum SNR by a sufficiently large margin, and if the telemetry signal is an EM signal, then battery power is conserved by reducing signal strength while maintaining the SNR above the minimum SNR (step 808). This can be done iteratively through trial and error. For example, if the SNR at step 804 is determined to be 8 or 10 whereas the minimum SNR is 3, then in one embodiment the SNR is sufficiently high such that it may be reduced so as to conserve battery power, with the SNR being iteratively reduced to a value at or slightly above the minimum SNR.

The method 800 of FIG. 8 can be applied to both MP and EM telemetry. For example, to reduce the SNR in an EM telemetry tool, an EM processor of the tool will reduce (step down) the voltage of the transmitted signal in response to a downlink signal received from the surface. Analogously, if SNR is to be increased (e.g. if while iteratively reducing SNR, the SNR is reduced to below the minimum SNR) the EM processor increases (steps up) the voltage of the signal. When applied to MP telemetry, a processor of an MP telemetry tool analogously increases and decreases mud pulse pressure by controlling actuation of the motor, although decreasing SNR may not result in the same level of power savings as it will with EM telemetry.

Analogously, although not depicted in FIG. 8, in alternative embodiments if it is determined that the SNR is insufficient to enable telemetry signals to be decoded at surface, signal strength may be increased to increase SNR above the minimum SNR so that telemetry is possible.

The system may periodically send signals to the surface to inform drillers at the surface of the current state of the batteries 100. For example, the system 300 may send a message to the surface whenever a fault occurs, such as a current peak or a low voltage event, or it may inform the surface of remaining battery capacity to facilitate generation of maintenance schedules.

The system 300 can help to improve overall utilization of the batteries 100 relative to conventional battery management systems. In a conventional system, it can be difficult to deploy partially used batteries into service as it is not obvious how to balance the economic benefit of fully draining batteries with the cost of lost performance if batteries die while downhole. Consequently, in a conventional battery management system, batteries are commonly retired well prior to reaching a usage level of 80%. The system 300 described herein can be used to use batteries up to and even beyond a usage level of 80% while mitigating against the risk of batteries unexpectedly dying while downhole.

Furthermore, the system 300 can improve battery performance by having multiple batteries share loads during peak current events and during low voltage events. Doing this can help extend the life of the batteries 100.

Stabilizing battery performance during low voltage and peak current events can also benefit performance of the MP and EM telemetry equipment. For example, stable voltage and current supplies can result in improved MP motor control, pulse timing control, and increased torque, which can help remove debris when a jam occurs. Similarly, stable voltage and current supplies can result in amplitude stability when using EM telemetry, which can increase telemetry rates.

The controller used in the foregoing embodiments may be, for example, a microprocessor, microcontroller, digital signal processor, programmable logic controller, field programmable gate array, or an application-specific integrated circuit. Examples of the computer readable medium are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A battery management system for use in a downhole drilling application, the battery management system comprising:
   (a) a power bus;
   (b) pairs of battery terminals, wherein each of the battery terminals is for connecting to a battery;
   (c) switching circuitry operable to electrically connect the power bus to and to disconnect the power bus from any one or more of the pairs of battery terminals electrically connected in parallel;
   (d) data collection circuitry operable to obtain battery parameters of batteries connected to the pairs of battery terminals;
   (e) a controller operable to control the switching circuitry and to receive the battery parameters from the data collection circuitry; and
   (f) a control line communicatively connecting the controller to the switching circuitry and a data line, distinct from the control line, communicatively connecting the controller to the data collection circuitry.

2. The system of claim 1 wherein there are multiple control lines, and the controller is configured to use each of the control lines to control whether only one of the pairs of battery terminals is connected to or disconnected from the power bus.

3. The system of claim 1 wherein there are multiple data lines, and the controller is configured to use each of the data lines to receive the battery parameters from only one of the batteries.

4. The system of claim 1 wherein the controller is configured to use time division multiplexing to receive the battery parameters from any one of the batteries at any given time.

5. The system of claim 1 further comprising a capacitor bank electrically connected in parallel to the power bus.

6. The system of claim 1 wherein the data collection circuitry comprises current samplers electrically connected to the pairs of battery terminals such that current flowing through each of the pairs of battery terminals is measurable.

7. The system of claim 6 wherein the control circuitry is configured to disconnect the any one or more of the battery terminals from the power bus when current flowing out of the any one or more of the battery terminals exceeds a current shutdown threshold or when instructed by the controller.

8. The system of claim 1 wherein the data collection circuitry comprises A·h meters electrically connected to the pairs of battery terminals to record usage of each of the batteries.

9. The system of claim 1 wherein the controller, switching circuitry, and control line are on a common printed circuit board.

10. The system of claim 9 further comprising usage tracking boards, connected to the pairs of battery terminals, each of which has mounted thereon one of the A·h meters, wherein each of the usage tracking boards comprises a printed circuit board distinct from the printed circuit board on which the controller, switching circuitry, and control line are located.

11. The system of claim 1 wherein the data collection circuitry comprises voltmeters electrically connected to the pairs of battery terminals to record voltage of each of the batteries.

12. The system of claim 1 wherein the controller is configured to:
  (a) for at least one of the batteries:
    (i) determine a usage level of the battery; and
    (ii) compare the usage level to an active usage threshold; and
  (b) when the usage level of at least one of the batteries meets the active usage threshold, using as a constant power source for the drilling application at least one of the batteries whose usage level meets the active usage threshold.

13. The system of claim 12 wherein the controller is further configured to use all of the batteries as the constant power source when the usage level of none of the batteries meets the active usage threshold.

14. The system of claim 12 wherein the drilling application is downhole telemetry, and wherein the controller is further configured to send a signal to surface indicating when the usage level of none of the batteries meets the active usage threshold.

15. The system of claim 12 wherein the controller is configured to use only one of the batteries as the constant power source.

16. The system of claim 15 wherein the controller is configured to use as the constant power source the battery having the usage level that is highest of all the usage levels that have been determined.

17. The system of claim 16 wherein the controller is further configured to:
  (a) determine when the charge level of the battery that is used as the constant power source ("initial primary battery") ceases to meet the active usage threshold; and
  (b) when the charge level of the initial primary battery ceases to meet the active usage threshold:
    (i) determine whether the usage level of any of the other batteries meets the active usage threshold; and
    (ii) when the usage level of any of the other batteries meets the active usage threshold:
      (1) cease to use the initial primary battery as the constant power source; and
      (2) of the batteries whose usage level meets the active usage threshold, use the battery having the highest usage level as the constant power source.

18. The system of claim 12 wherein the controller is further configured to use at least one of the batteries not used as the constant power source ("backup battery") to supplement energy provided by the at least one of the batteries that is used as the constant power source ("primary battery").

19. The system of claim 18 wherein at least one of the batteries has an unknown usage level, and wherein the controller is configured to use as the backup battery at least one of the batteries that has an unknown usage level.

20. The system of claim 18 wherein the controller is configured to use the backup battery to supplement energy when current drawn from the primary battery exceeds a current assist threshold.

21. The system of claim 18 wherein the controller is configured to use the backup battery to supplement energy when voltage of the primary battery falls below a voltage assist threshold.

22. The system of claim 18 wherein controller is configured to use the backup battery to supplement energy in response to an impending telemetry event.

23. The system of claim 12 wherein, for at least one of the batteries, the controller is further configured to:
  (a) determine a voltage level of the battery;
  (b) compare the voltage level to a safe voltage threshold; and
  (c) use the battery as the constant power source only if the voltage level of the battery exceeds the safe voltage threshold.

24. A method for managing batteries used in a downhole drilling application, the method comprising: (a) for at least one of the batteries: (i) determining a usage level of the battery; and (ii) comparing the usage level to an active usage threshold; and (b) when the usage level of at least one of the batteries meets the active usage threshold, using as a constant power source for the drilling application at least one of the batteries whose usage level meets the active usage threshold; wherein only one of the batteries is used as the constant power source, and the battery that is used as the constant power source is the battery having the usage level that is highest of all the usage levels that have been determined.

25. The method of claim 24 further comprising when the usage level of none of the batteries meets the active usage threshold, using as the constant power source all of the batteries.

26. The method of claim 24 further comprising wherein the drilling application is downhole telemetry, sending a signal to surface indicating when the usage level of none of the batteries meets the active usage threshold.

27. The method of claim 24 further comprising:
  (a) determining when the usage level of the battery that is used as the constant power source ("initial primary battery") ceases to meet the active usage threshold; and
  (b) when the usage level of the initial primary battery ceases to meet the active usage threshold:
    (i) determining whether the usage level of any of the other batteries meets the active usage threshold; and
    (ii) when the usage level of any of the other batteries meets the active usage threshold:
      (1) ceasing to use the initial primary battery as the constant power source; and (2) of the batteries whose usage level meets the active usage threshold, using the battery having the highest usage level as the constant power source.

28. The method of claim 24 further comprising using at least one of the batteries not used as the constant power source ("backup battery") to supplement energy provided by the at least one of the batteries that is used as the constant power source ("primary battery").

29. The method of claim 28 wherein at least one of the batteries has an unknown usage level, and wherein the backup battery comprises at least one of the batteries that has an unknown usage level.

30. The method of claim 28 wherein the backup battery supplements energy when current drawn from the primary battery exceeds a current assist threshold.

31. The method of claim 28 wherein the backup battery supplements energy when voltage of the primary battery falls below a voltage assist threshold.

32. The method of claim 28 wherein the backup battery supplements energy in response to an impending telemetry event.

33. The method of claim 24 further comprising, for at least one of the batteries:
   (a) determining a voltage level of the battery;
   (b) comparing the voltage level to a safe voltage threshold; and
   (c) using the battery as the constant power source only if the voltage level of the battery exceeds the safe voltage threshold.

* * * * *